United States Patent [19]
Tharp

[11] 3,788,672
[45] Jan. 29, 1974

[54] ROLLER BEARING FOR LOGGING TRUCK AND TRAILER

[76] Inventor: Jack L. Tharp, P.O. Box 867, Willits, Calif. 95490

[22] Filed: May 26, 1972

[21] Appl. No.: 257,118

[52] U.S. Cl. ............................... 280/404, 280/438
[51] Int. Cl. ............................................. B62d 53/08
[58] Field of Search ............................ 280/404, 438

[56] References Cited
UNITED STATES PATENTS

| | | | |
|---|---|---|---|
| 3,350,116 | 10/1967 | Skirvin et al. | 280/404 R |
| 3,027,959 | 4/1962 | Mailliard | 280/404 X |

Primary Examiner—David Schonberg
Assistant Examiner—Randall A. Schrecengost
Attorney, Agent, or Firm—John L. McGannon

[57] ABSTRACT

An improved roller bearing for the pivotal, log-supporting bunks of a logging truck-trailer combination. Each bunk has four such bearings, two near each end and on opposite sides of the bunk. The bearings are engageable with the flat, upper surface of the support structure below the bunk to allow the bunk to pivot easily relative to the support structure. Each roller has its longitudinal axis aligned with the pivotal axis of the bunk.

9 Claims, 5 Drawing Figures

PATENTED JAN 29 1974 3,788,672

ROLLER BEARING FOR LOGGING TRUCK AND TRAILER

This invention relates to improvements in the mounting of log-supporting bunks for a logging truck-trailer combination and, more particularly, to improved bearings for such a bunk.

On a logging truck-trailer combination, logs are carried on a pair of spaced, front and rear bunks or beams which extend transversely of the normal direction of travel of the trucks. The front bunk is pivotally mounted on the rear end of the truck and the rear bunk is pivotally mounted on the trailer, the latter being pivotally connected by a tongue or reach to the rear end of the truck. Each bunk can pivot about a generally upright axis and also about a generally horizontal axis which extends longitudinally of the tongue or reach.

Since the truck-trailer combination is quite long so as to accommodate logs of relatively long lengths, the truck and trailer during turns becomes a serious problem. Not only is a more skilled truck operator required, but also the bunks must pivot properly during turns relative to the truck and trailer to avoid such conditions as bunk binding, bunk locking and excessive friction between the bunks and the support structures therebelow. These conditions cause the truck operator to expend a large amount of effort in controlling the truck during a turn.

Generally, each bunk has two rub irons or wear plates at the opposed ends thereof and these rub irons are normally spaced above the flat, upper surface of the support structure below the bunk. However, when the bunk tips to the right or to the left, these rub irons frictionally engage the table surface and slide along the same, causing wear of both surfaces and resulting in either bunk binding or bunk locking. Bunk binding is a condition in which the bunk does not readily pivot relative to the support structure therebelow during a turn as the load of logs carried by the bunk tends to continue in a straight line, namely, the straight line direction of the truck. Bunk locking is a condition in which the bunks do not turn because of the galling or freezing of the two surfaces together, in which case, the truck cannot make a turn because it cannot pivot relative to the load of logs on the bunks.

Attempts have been made to minimize these problems by greasing the rub iron and support surfaces therebelow. However, this is only a temporary expedient because dust and dirt settle in the grease and become an abrasive, thereby adding to the friction and defeating the purpose of the grease.

Among other problems the conventional structure gives rise to are the greater wear of the tires of the truck in making a turn because the tires oftentimes spin on the roads because of insufficient traction. Moreover, the truck oftentimes requires a relatively large turning radius on loose dirt roads to prevent spinning of the truck relative to the load. The large turning radius cannot be attained on some roads, such as those having "hairpin" turns. Thus, further control problems arise. Also, a considerable amount of time must be spent in balancing the load of logs so that the bunks will not be tipped one way or the other so as to unnecessarily cause the rub irons thereof to scrape the support surfaces therebelow. The tongue or reach is oftentimes under excessive strain during turns, and such strain can be great enough to cause the reach to break, requiring replacement of the reach before the truck can continue.

The present invention overcomes all of the aforesaid problems by providing an improved bearing for use with each bunk at strategic locations thereon to allow the bunk to pivot more readily on the truck or trailer so as to permit greater control of the truck during a turn. The bearing thus eliminates binding and galling as occurs with the rub irons of conventional construction.

Each bunk is provided with four such bearings, two at each end and on opposite sides of the bunk. Each bearing has a roller which can engage and roll over support surface therebelow when the bunk tips in the proper direction during a turn. Moreover, the rollers are arranged so that their longitudinal axes extend through the generally upright axis of pivotal movement of the corresponding bunk so that the rollers themselves will roll rather than slide or skid acorss the table surface, thereby further enhancing the control of the truck during a turn. The bearings of the present invention can be readily applied to existing bunks after the conventional rub irons have been removed. When the bearings are applied to the bunks, they serve to make driving much easier during turns inasmuch as a load of logs carried on the bunks can shift much easier relative to the truck and trailer, thereby eliminating bunk binding, bunk locking and other frictional effects.

The primary object of this invention is to provide an improved bearing for the bunks of a logging truck-trailer combination for eliminating the need for conventional rub irons and to overcome the problems caused by bunk binding, bunk locking and other frictional effects and to avoid the need for applying grease to such rub irons.

Another object of this invention is to provide a bearing assembly for the purpose described wherein the assembly includes a number of rollers mounted on each bunk at specific locations so as to engage the flat, upper support surface below the bunk and to roll over such surface when the bunk tips during a turn to allow the bunk to pivot more readily and thereby to permit greater control of the trunk during turns even in turns of relatively small radius.

Still another object of this invention is to provide an improved bearing structure for a logging bunk to allow the latter to pivot relative to its support structure without placing strain on the various parts of the truck-trailer combination, expecially the tongue connecting the trailer to the truck to thereby eliminate the breakdown of the parts and to assure long operating life therefor.

Other objects of this invention will become apparent as the following specification progresses, reference being had to the accompanying drawing for an illustration of the invention.

Figure 3:
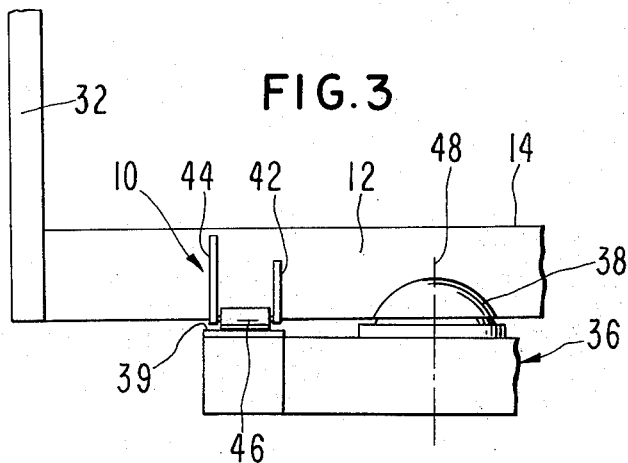
FIG. 3 is an enlarged, fragmentary, front elevational view of the bunk when the same is tilted so that the bearing of the present invention engages the table therebeneath.

The bearing of the present invention is broadly denoted by the numeral 10 and is shown in FIG. 3 as being on the front face 12 of a transverse bunk 14 on the rear end of a logging truck 16. The truck is adapted to pull a trailer 18 by means of a tongue or reach 20 pivotally connected at a point 22 at the rear end of the truck. Trailer 18 also has a bunk 24 which is identical to bunk 14 so that a description of one of the bunks applies equally well to the other bunk.

Figure 5:
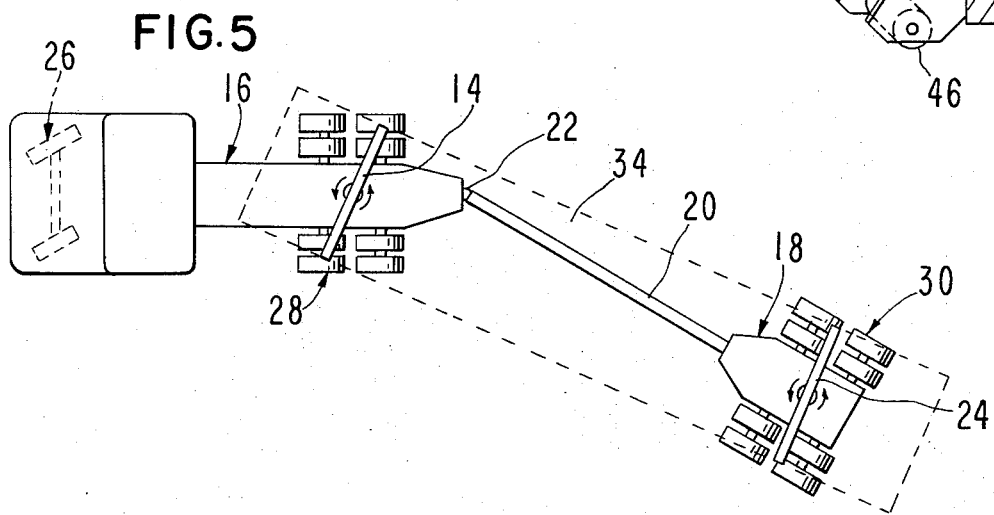
FIG. 5 is a schematic top plan view of the logging truck and trailer in a left turn when loaded with logs, the logs being omitted to simplify the drawing.

Truck 16 has a front wheel assembly 26 and a rear wheel assembly 28, bunk 14 being generally mounted near the rear wheel assembly 28. Similarly, trailer 18 has a wheel assembly 30 and bunk 24 is mounted between the front and rear portions of wheel assembly 30. Each bunk has a pair of generally upright stakes 32 (FIG. 1) between which a number of logs 34 are disposed. The logs extend between bunks 14 and 24 and beyond the latter as shown in FIG. 5.

Each bunk is pivotally mounted on a support structure or table 36 by pivot structure 38 sometimes known as the "cup and saucer." Such pivot structure allows the bunk to pivot about a generally upright or vertical axis as well as a generally horizontal axis extending fore and aft of the truck-trailer combination. Thus, bunk 14 can pivot about the upright axis relative to the truck-trailer combination into a position shown in FIG. 5 and can also rock about the horizontal axis into the position shown in FIG. 3. Generally, the bunks are horizontally disposed and perpendicular to the normal path of travel of the truck-trailer combination for straight line travel. During turns, the bunks pivot and rock as the load of logs thereon shifts.

Each table 36 has a generally flat, upper surface 39 beneath the corresponding bunk. In the past, a rub iron or skid was secured to each end of a bunk and disposed for rubbing or sliding engagement with upper surface 39 when the bunk was tipped as shown in FIG. 3 and as the bunk pivoted about a generally upright axis, such as during a turn. This caused wear of both surface 39 and the rub iron and required much effort to control the truck during turns.

All of the problems associated with conventional rub irons are eliminated by the use of bearing 10 because it allows a bunk to turn more readily on table 36 therebelow so as to minimize the spinning of the truck tires on the road during a turn. It is thus easier on the gear train of the truck and allows a turn to be more easily executed because there is no excessive friction between the bunk and the table therebelow. It allows a truck to turn at a smaller radius on loose dirt roads and minimizes log loading time because there is less need to balance the loads on the bunks. It also takes the strain off reach 20 during a turn so that the reach has a much greater operating life than has been capable before. The use of the present invention also significantly reduces wear of the front tires of the truck because the bearing of the invention allows the front bunk to pivot more easily relative to the truck. Thus, there is much less tendency for the front tires to skid or slide over the road as a turn is being made. This skidding or sliding has been the cause of tire wear when conventional rub irons have been used.

There are four bearings 10 on each bunk, respectively, two bearings near each end of the bunk and on the front and rear faces thereof. Each bearing includes a pair of spaced brackets or mounting plates 42 and 44 which are welded at first side margins thereof to the bunk and extend transversely therefrom. A roller 46 is rotatably mounted on the outer, lower ends of brackets 42 and 44 and is adapted to move into rolling engagement with surface 39 when the corresponding bunk is tipped about its longitudinal, horizontal axis. When the bunk is horizontal, each roller 46 is out of engagement with table 36. To this end, each roller has its outboard end slightly higher than its inboard end. This will cause the roller to be inclined slightly when the bunk is horizontal. Thus, as the bunk tips or rocks into the position shown in FIG. 3, the two corresponding rollers 46 will move into substantially line contact with upper surface 39 for rolling engagement therewith.

Figure 2:
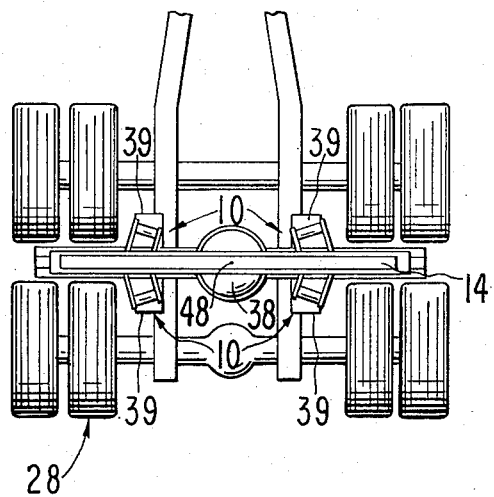
FIG. 2 is a top plan view of the bunk at the rear end of the truck.

Each roller 46 is angled with respect to the longitudinal axis of the corresponding bunk so that the axis of the roller will pass through the center point 48 of the corresponding pivot structure 38 as shown in FIG. 2. Thus, the roller will thereby rotate along an arcuate path during a turn with the path having its central axis through point 48. This will thereby allow the roller to roll rather than skid or slide on surface 39 as the bunk pivots relative to its table 36 therebelow. Moreover, the two rollers at each end of the bunk are arranged so that they simultaneously engage surface 39 and roll along the same, the axes of the two rollers at each end of the bunk being convergent as point 48 is approached as shown in FIG. 2.

Figure 4:
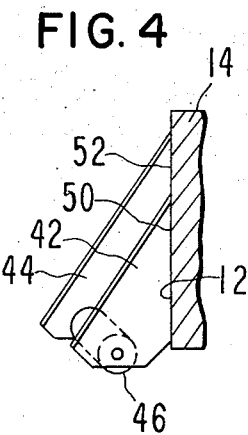
FIG. 4 is a side elevational view of the bearing looking in the direction of line 4—4 of FIG. 3.

FIG. 4 illustrates the two brackets for each bearing 10. Bracket 42 is smaller in size than bracket 44 and the first margins 50 and 52 of the two brackets 42 and 44, respectively, are shaped so that they will properly fit the flat face 12 of the corresponding bunk. Also, the brackets are made so that the outer end of the corresponding roller 46 will not only be above the inner end of the roller when the bunk is horizontal, but the outer end of the roller will be further away from the bunk than the inner end to achieve the geometry shown in FIG. 2.

Figure 1:
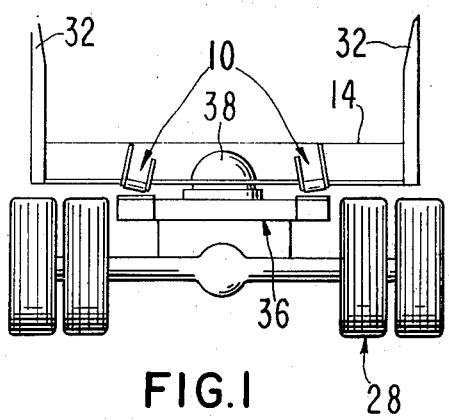
FIG. 1 is a front elevational view of a log-supporting bunk at the rear end of a logging truck.

In operation, each bunk will have the four bearings 10 mounted as shown in FIGS. 1 and 2. When a load of logs 34 is placed between bunks 14 and 24, the logs will assume the operative positions extending between the bunks as shown in FIG. 5. Generally, reach 30 will be aligned with the longitudinal axis of truck 16.

As the truck proceeds down the road, the logs will be generally parallel with the path of the truck. In such a case, bunks 14 and 24 are perpendicular to such path. As the truck makes a left turn, for instance, as shown in FIG. 5, front wheels 26 go to the left and rear wheels 28 will eventually follow the front wheels. However, the load of logs 34 tends to continue in the initial direction of travel of the truck because the turning motion of the truck has not been transmitted to the trailer because wheels 30 are still directed in the initial direction of the truck travel. This is due to the pivot connection at point 22.

As the load of logs continues in the initial direction of travel, bunk 14 pivots in a clockwise sense when viewing FIG. 5 and when this occurs, the bunk may be tipped toward the right-hand wheels of the rear wheel assembly 28. When this occurs, the corresponding rollers 46 of the adjacent bearings 10 will engage and roll over surface 39 of table 36. This will allow the bunk to readily turn without binding and with minimum friction. The turn can thereby be made easily because there is not retarding or frictional force exerted on the truck due to the bunk which would inhibit the turning of the front wheels of the truck.

As the front bunk 14 pivots, rear bunk 24 pivots in the opposite direction, namely, in a counterclockwise sense relative to trailer 18 because it is caused to do so by logs 34. The rollers at the opposite end, namely, near the left-hand wheels of the wheel assembly 30 of trailer 18 engage the corresponding table surface 39 and allow the rear bunk 24 to turn easily relative to the trailer. During the turn, the logs continue to make an angle with the longitudinal axis of the truck during the turn so that bunks 14 and 24 maintain the attitudes shown in FIG. 5. As the front wheels 26 are straightened, trailer 18 comes into alignment with the longitudinal axis of the truck, thereby bringing the logs back into parallelism with the straight line travel of the truck. This causes front bunk 14 to pivot in a counterclockwise sense and causes rear bunk 24 to pivot in a clockwise sense. Again, during the pivoting of the bunks, certain of the rollers of the bunks will engage the table surfaces 39 therebelow but even so, there is minimum friction between the rollers and such surfaces so as to allow the bunks to pivot readily to straighten out the load and to minimize the strain on the various parts including the strain on the driver trying to straighten the wheels of the truck.

In executing a right turn, the foregoing bunk movements are reversed and, again, the rollers engage table surfaces 39 as described above to minimize the friction between the rollers and the table.

In installing bearings 10 on a bunk, the old rub irons are taken off, such as by a cutting torch and a spacer is placed between table surface 39 and one end of a bunk, whereupon the opposite end of the bunk is jacked-up until it engages the spacer. Then the two bearings 10 are secured to the opposite sides of the lowered end of the bunk by welding so that rollers 46 thereof engage surface 39 as shown in FIG. 3. When this is completed, the above steps are repeated for the opposite end of the bunk, whereupon the bunk will be ready for use. The brackets are secured in place and spaced apart from each other by a distance greater than the length of the corresponding roller as shown in FIG. 3 so that the roller can travel longitudinally therebetween for a limited distance to avoid binding of the roller.

I claim:

1. In a logging truck-trailer combination of the type having front and rear log-supporting bunks with each bunk being pivotally mounted on and disposed above a support having a flat, upper surface, the improvement comprising: a bearing for attachment to the bunk adjacent to one end thereof, said bearing including a roller and means coupled with the ends of the roller for rotatably mounting the same on the bunk on one side thereof in a position with the roller extending longitudinally of the bunk and spaced above said support surface when the bunk is in a first operative position relative thereto, said roller being movable into engagement with the support surface therebelow as the bunk pivots from said first operative position to a second operative position about a generally horizontal axis extending transversely of the bunk, whereby the bunk can readily pivot about an upright axis relative to the support.

2. In a combination as set forth in claim 1, wherein the mounting means includes a pair of spaced mounting plates having configurations permitting the roller to be secured to the bunk with the longitudinal axis of the roller intersecting the pivotal axis of the bunk.

3. In a logging truck-trailer combination: a log-supporting bunk; a support below the bunk, said support having a flat, upper surface; structure mounting the bunk on the support for pivotal movement about a first, generally upright axis and about a second, generally horizontal axis extending transversely of the bunk; and a pair of bearings for each end of the bunk, respectively, each pair of bearings being secured to respective, opposite sides of the bunk, each bearing including a roller and a pair of spaced brackets for rotatably mounting the roller on the bunk with the roller extending between the brackets, each roller extending longitudinally of the bunk and movable into engagement with said upper surface therebelow when the bunk pivots about said second axis, whereby the roller can roll over said upper surface as the bunk pivots about said first axis.

4. In the combination as set forth in claim 3, when the rollers are disposed with their longitudinal axis substantially intersecting said second axis.

5. In the combination as set forth in claim 3, wherein the outer end of each roller is higher than the inner end thereof when the bunk is substantially horizontal so that the roller can move into rolling engagement with said upper surface when the bunk pivots about said second axis.

6. In the combination as set forth in claim 3, wherein the bunk has front and rear faces, the brackets of each bearing being secured to a respective bunk face and extending laterally therefrom, the lower margins of the brackets being below the bottom of the bunk, each roller being secured to the roller margins of the corresponding brackets.

7. In a logging truck-trailer combination of the type having front and rear log-supporting bunks with each bunk being pivotally mounted on and disposed above a support having a flat, upper surface, the improvement comprising: a bearing for attachment to the bunk adjacent to one end thereof, said bearing including a roller and a pair of brackets, each bracket having first and second margins, the first margins adapted to be attached to one side of the bunk and the second margins adapted to be attached to the ends of the roller for rotatably mounting the same on the bunk on one side thereof in a position with the roller extending longitudinally of the bunk, the second margins being disposed to position one end of the roller above the opposite end thereof to permit the roller to move into engagement with the support surface therebelow as the bunk pivots from a first operative position to a second operative position about a generally horizontal axis extending transversely of the bunk, whereby the bunk can readily pivot about an upright axis relative to the support.

8. In a combination as set forth in claim 7, wherein the brackets are adapted to be secured to one side of the bunk near its outer end, the outboard bracket being disposed to position the corresponding end of the roller at a location further from the bunk than the opposite end of the roller with the axis of the roller passing through the pivotal axis of the bunk.

9. In a combination as set forth in claim 7, wherein the transverse width of the outboard bracket is greater than that of the inboard bracket.

* * * * *